Dec. 16, 1924.
O. F. GREEN
SPRAYER
Filed Aug. 25, 1923
1,519,199
2 Sheets-Sheet 1
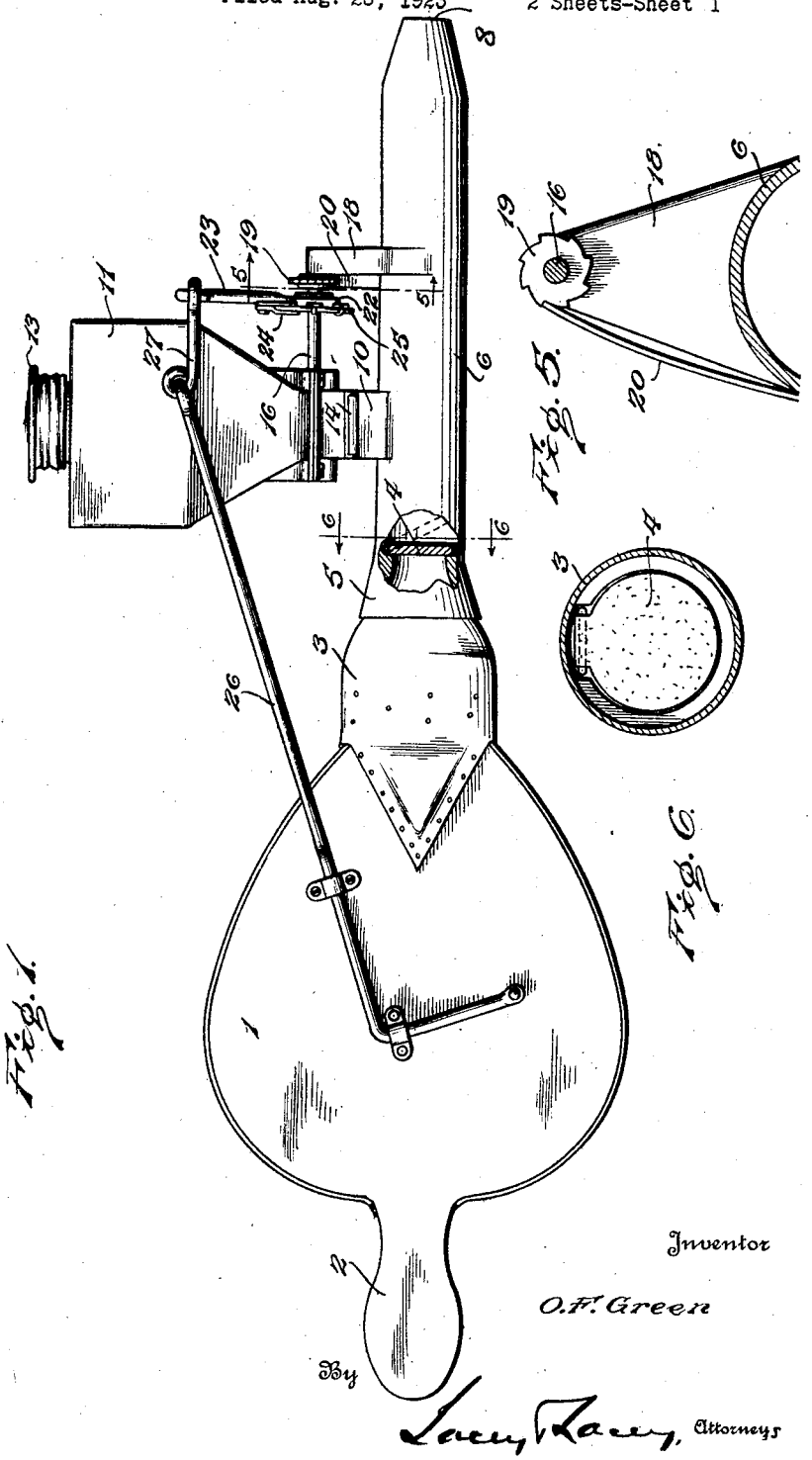

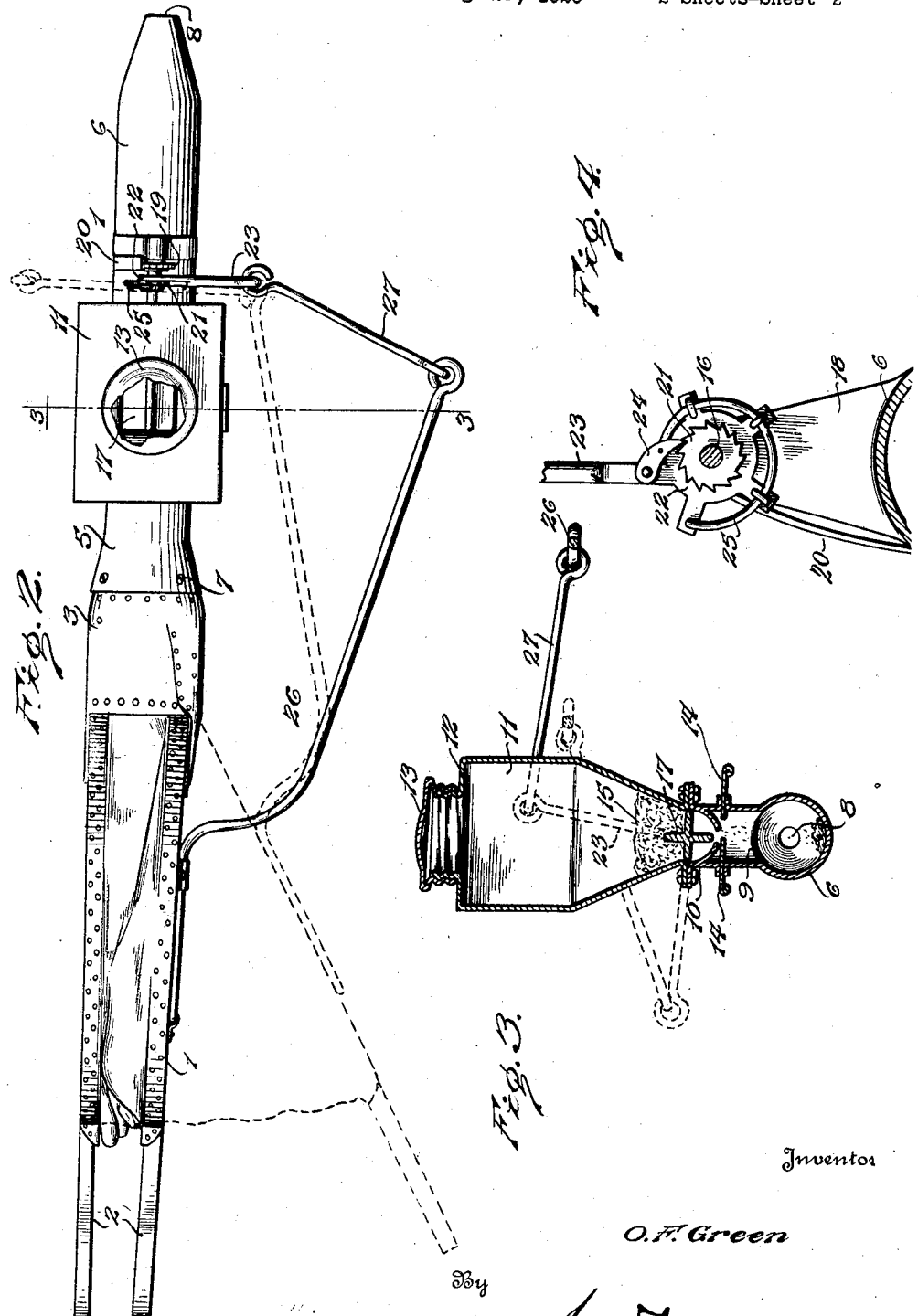

Patented Dec. 16, 1924.

1,519,199

UNITED STATES PATENT OFFICE.

OKIE F. GREEN, OF CYNTHIANA, KENTUCKY.

SPRAYER.

Application filed August 25, 1923. Serial No. 659,370.

*To all whom it may concern:*

Be it known that I, OKIE F. GREEN, a citizen of the United States, residing at Cynthiana, in the county of Harrison and State of Kentucky, have invented certain new and useful Improvements in Sprayers, of which the following is a specification.

This invention relates to devices for spraying powder, such as disinfectants, and is intended more particularly for use in spraying poison upon plants to destroy fungi and animal pests thereon. The invention seeks to provide a sprayer which may be easily carried and operated by hand without fatigue and in which the clogging of the powder will be prevented and the same discharged in a fine mist-like stream. The invention also seeks to provide a sprayer of simple and inexpensive construction which may contain a supply of the powder and which will prevent the flow of the powder in a direction away from the discharge nozzle. Other objects of the invention will appear incidentally in the course of the following description, and the invention resides in certain novel features which will be particularly pointed out in the appended claims.

In the accompanying drawings, which illustrate one embodiment of the invention,—

Figure 1 is a side elevation, partly broken away, of my improved sprayer;

Fig. 2 is a plan view of the same;

Fig. 3 is a transverse section on the line 3—3 of Fig. 2;

Fig. 4 is an enlarged transverse section showing the feed-controlling mechanism;

Fig. 5 is an enlarged transverse section on the line 5—5 of Fig. 1, and

Fig. 6 is a detail section on the line 6—6 of Fig. 1.

In carrying out my invention, I employ a bellows 1 which may be of any well-known construction and provided with handles 2 whereby it may be operated. The spout 3 of the bellows is equipped with a check valve 4 opening outwardly so that, while outward flow of air will be permitted upon the folding of the bellows, a backward flow through the spout upon expansion of the bellows will be prevented. The bellows is provided in one side with the usual inlet openings and valves controlling the same (not shown) so that, when the bellows is expanded, as shown by dotted lines in Fig. 2, air will be drawn into the same to be compressed and expelled upon the subsequent folding of the bellows. The forward end of the spout 3 is fitted within the flared or funnel-like rear end 5 of a discharge pipe or nozzle 6, and these parts are rigidly secured together by any preferred means, such as screws 7, inserted through the funnel 5 into the sides of the spout, as shown in Fig. 2 and as will be readily understood. The nozzle or pipe 6 may be of any desired length and its forward discharge end is contracted and tapered so as to provide a relatively small discharge opening 8. At a point adjacent its rear end, the nozzle 6 is formed with an opening 9 in its upper side, and a tubular standard or support 10 is formed or secured upon the nozzle around the edges of said opening to carry and establish communication with a hopper 11. This hopper 11 has an open bottom and is provided in its top with any preferred form of filling opening, such as a threaded collar 12 adapted to be engaged by a cap 13. In the sides of the tubular standard 10 are slidably mounted cut-off valves or dampers 14 which fit closely within the openings provided therefor in the sides of the support and may be easily adjusted so as to regulate the quantity of the powder, indicated at 15, which may pass into the nozzle. The lower end of the hopper 11 is suitably formed to provide bearings for a shaft 16 which carries a feeder 17 substantially filling the exit of the hopper. This feeder may be of any desired type which upon rotation will feed the powder to the outlet and prevent the same clogging at the bottom of the hopper, and in the drawings I have shown a device consisting of a single body of cruciform cross section which has been found very efficient. The front end of the shaft 16 is journaled in a post 18 secured in any preferred manner upon the nozzle, and secured upon the shaft adjacent said post is a ratchet disk 19 which is engaged by a spring dog 20 rising from the nozzle or the side of the post adjacent the ratchet, as will be readily understood. This arrangement prevents rotation of the shaft in one direction but permits its rotation in the opposite direction. A second ratchet disk 21 is secured upon the shaft 16 in rear of the disk 19, and loosely mounted upon the shaft adjacent the said ratchet disk 21 is a circular head or disk 22 rigid with or forming a part of an operating lever 23. A pawl 24 is pivoted upon the lever 23 in position to engage the disk 21, and a spring 25 is carried by the head 22 and bears upon the said pawl so as to hold the same to the ratchet. An operating arm 26 is secured upon one side of the bellows 1 and extends laterally and forwardly therefrom, the front end of the said arm being connected by a link 27 with the free end of the lever 23, as clearly shown.

In the use of the device, the powder to be distributed is placed in the hopper 11 and the cap 13 secured upon the hopper so as to prevent the powder being blown through the filling opening 12. The device is then held by the handles 2 and the discharge nozzle 6 pointed toward the place to be disinfected or the plant to be sprayed and the bellows alternately expanded and compressed in the usual manner. The spout 3 of the bellows is of some stout flexible material and the sides of the bellows have an approximately pivotal movement relative to the said spout, the rocking or operating arm 26 following the movement of the side of the bellows to which it is attached. When the bellows is expanded, as shown by the dotted lines in Fig. 2, the forward end of the arm 26 will be caused to move toward the hopper, and this movement will result in the lever 23 being swung downwardly and to the left through the action of the link 27, as indicated by the dotted lines in Figs. 2 and 3. The return movement of the lever 23, as the bellows is closed, will impart a partial rotation to the shaft 16 through the action of the pawl 24 and the ratchet 21 so that the feeder 17 will be partly rotated and a portion of the powder will be fed from the hopper into the nozzle 6. When the bellows is compressed, the air which has been drawn thereinto will be forced outwardly past the check valve 4 and through the discharge nozzle 6 carrying with it the powder which has been deposited in the nozzle, the powder escaping through the orifice 8 in a fine spray. Preferably, the feeder shaft will be given one quarter of a turn at each operation so that the feeder will come to rest in the position shown in Fig. 3 with two arms extending across the discharge opening of the hopper and thereby serving to cut-off flow through said opening, whereby the rise of the powder through the tubular support 10 will be prevented and the air blast and the powder can escape only through the discharge opening 8. When the bellows is again closed, the feeder will be given another quarter turn so that a fresh charge of powder will be delivered into the nozzle, and it will be readily noted that back flow of the powder is prevented by the feeder and by the check valve 4 so that, when a stream of air is discharged from the nozzle 6, the powder delivered into the nozzle must be carried out with the air.

My device is very simple in construction and compact in the arrangement of its parts, it operates very easily, and may be used for a considerable period without the operator becoming fatigued. Waste of the powder is prevented while, as long as the supply in the hopper lasts, a sufficient quantity of powder will be discharged from the nozzle at each actuation of the bellows to accomplish the desired results.

Having thus described the invention, what is claimed as new is:

1. A device for the purpose set forth comprising a bellows, a nozzle projecting forwardly from the front end of the bellows in alinement therewith, a hopper on the nozzle in communication therewith, a rotatable feeder in the bottom of the hopper having its axis extending parallel with the nozzle, and means mounted on the nozzle and controlled by the bellows for imparting a step by step movement to the feeder.

2. A device for the purpose set forth comprising a bellows, a nozzle leading from the front end of the bellows in alinement therewith, a hopper on the nozzle beyond the end of the bellows, a feeder shaft supported by the nozzle and the hopper, a feeder on said shaft in the bottom of the hopper and extending longitudinally of the nozzle parallel therewith, a lever loosely mounted on said shaft, ratchet mechanism operatively connecting said normally upstanding lever with the said shaft to rotate the shaft in one direction, means for preventing rotation of the shaft in the opposite direction only, an operating arm secured to the side of the bellows and projecting forwardly and laterally therefrom, and a link connecting the forward end of said arm with the free end of the said lever.

In testimony whereof I affix my signature.

OKIE F. GREEN. [L. S.]